US009469818B2

(12) United States Patent
Baldiraghi et al.

(10) Patent No.: US 9,469,818 B2
(45) Date of Patent: Oct. 18, 2016

(54) HYDROCARBON COMPOSITION USEFUL AS A FUEL AND FUEL OIL CONTAINING A PETROLEUM COMPONENT AND A COMPONENT OF A BIOLOGICAL ORIGIN

(71) Applicants: ENI S.p.A., Rome (IT); UOP LLC, Des Plaines, IL (US)

(72) Inventors: Franco Baldiraghi, Milan (IT); Silvia Guanziroli, Milan (IT); Giovanni Faraci, Milan (IT); Luigina Maria Flora Sabatino, Milan (IT); Terry Louise Marker, Des Plaines, IL (US); John Anthony Petri, Des Plaines, IL (US)

(73) Assignees: ENI S.p.A., Rome (IT); UOP LLC, Des Plaines, IL (US)

( * ) Notice: Subject to any disclaimer, the term of this patent is extended or adjusted under 35 U.S.C. 154(b) by 171 days.

(21) Appl. No.: 14/537,054

(22) Filed: Nov. 10, 2014

(65) Prior Publication Data
US 2015/0068109 A1     Mar. 12, 2015

Related U.S. Application Data

(62) Division of application No. 12/531,396, filed as application No. PCT/EP2008/001918 on Mar. 5, 2008, now abandoned.

(30) Foreign Application Priority Data

Mar. 16, 2007   (IT) .............................. MI2007A0522

(51) Int. Cl.
*C10G 65/02*     (2006.01)
*C10G 67/02*     (2006.01)
(Continued)

(52) U.S. Cl.
CPC ............... *C10G 65/02* (2013.01); *C10G 67/02* (2013.01); *C10G 67/14* (2013.01); *C10L 1/08* (2013.01);
(Continued)

(58) Field of Classification Search
CPC ...... C10G 65/02; C10G 67/02; C10G 67/14; C10L 1/08; C10L 10/14; C10L 2200/0446; C10L 2200/0484; C10L 2270/026; C10L 2290/542
See application file for complete search history.

(56) References Cited

U.S. PATENT DOCUMENTS 6,150,575 A     11/2000   Angevine et al.
2004/0230085 A1  11/2004   Jakkula et al.
(Continued)

FOREIGN PATENT DOCUMENTS

EP     0 582 347     2/1994
EP     1 396 531     3/2004
(Continued)

OTHER PUBLICATIONS

Dunn, R.O. et al. (1995). JOACS, 72(8), 895-904.*
(Continued)

*Primary Examiner* — Brian McCaig
(74) *Attorney, Agent, or Firm* — Oblon, McClelland, Maier & Neustadt, L.L.P.

(57) ABSTRACT

The invention relates to a hydrocarbon composition, which can be used as a fuel and/or fuel oil, containing a petroleum component (A) and a component of a biological origin (B), wherein the component of a biological origin is present in a quantity of up to 75% by volume with respect to the total composition. Said component of a biological origin (B) is prepared starting from a mix of a biological origin (C) containing esters of fatty acids, with possible aliquots of free fatty acids, by means of a process which comprises the following steps:
1) hydrodeoxygenation of the mix of a biological origin;
2) hydroisomerization of the mix resulting from step (1), after possible water and gas flow separation, wherein said hydroisomerization is preferably carried out in the presence of a catalytic system comprising:
   a) a carrier of an acidic nature, comprising a completely amorphous micro-mesoporous silica-alumina, with a $SiO_2/Al_2O_3$ molar ratio ranging from 30 to 500, a surface area larger than 500 $m^2/g$, a pore volume ranging from 0.3 to 1.3 ml/g, an average pore diameter smaller than 40 Å,
   b) a metal component containing one or more metals of group VIII, possibly mixed with one or more metals of group VIB.

67 Claims, 1 Drawing Sheet

(51) Int. Cl.
   *C10G 67/14*   (2006.01)
   *C10L 1/08*    (2006.01)
   *C10L 1/196*   (2006.01)
   *C10L 10/14*   (2006.01)
   *C10G 65/00*   (2006.01)

(52) U.S. Cl.
   CPC .............. *C10L 1/1966* (2013.01); *C10L 10/14* (2013.01); *C10L 2200/0446* (2013.01); *C10L 2200/0484* (2013.01); *C10L 2270/026* (2013.01); *C10L 2290/542* (2013.01); *Y02E 50/13* (2013.01)

(56) References Cited

U.S. PATENT DOCUMENTS

| | | |
|---|---|---|
| 2006/0207166 A1 | 9/2006 | Herskowitz et al. |
| 2008/0163543 A1* | 7/2008 | Abhari .................. C10G 45/60 44/308 |
| 2011/0258916 A1 | 10/2011 | Baldiraghi et al. |

FOREIGN PATENT DOCUMENTS

| | | |
|---|---|---|
| EP | 1 398 364 | 3/2004 |
| EP | 1396531 A2 | 3/2004 |
| EP | 1398364 A1 | 3/2004 |
| EP | 1 693 432 | 8/2006 |
| WO | 03022960 A2 | 3/2003 |
| WO | 2007 003709 | 1/2007 |
| WO | 2007027955 A2 | 3/2007 |

OTHER PUBLICATIONS http://science.howstuffworks.com/environmental/energy/oil-refining2.htm (2001).

"Petroleum Refining vol. 1 Process Flowsheets" edited by J.P. Wauquiuer at p. 215-216 (published in French in 1994 and in English in 1995) ISBN 2-8108-0685-1.

Automotive Diesel Fuels European Standard EN 590 Jan. 2004 at p. 8.

* cited by examiner

HYDROCARBON COMPOSITION USEFUL AS A FUEL AND FUEL OIL CONTAINING A PETROLEUM COMPONENT AND A COMPONENT OF A BIOLOGICAL ORIGIN

CROSS REFERENCES TO RELATED APPLICATIONS

This application is a Divisional Application of U.S. patent application Ser. No. 12/531,396,filed on Sep. 15, 2009, which was a 371 of International Patent Application No. PCT/EP2008/001918, filed on Mar. 5, 2009, and claims priority to Italian Patent Application No. MI2007A000522, filed on Mar. 16, 2007.

The present invention relates to a diesel composition, its preparation, its use and the use of a particular component for a new purpose.

The addition of alkyl esters of fatty acids to diesel fuel compositions, with the aim of reducing the environmental impact deriving from the use of conventional fuels of an oil origin, is known. The addition of these products of a biological origin can, on the other hand, cause a loss of quality of the resulting mix, due to the fact that these products have worse properties from the point of view of cold behaviour with respect to diesel fuel of an oil origin, and also to the fact that these compounds cause problems of instability due to the presence of unsaturations.

A diesel composition is described in EP 1674552, containing a diesel base and an alkyl ester of palm oil (POAE) wherein the addition of the alkyl ester, in a final concentration of 25% v/v with respect to the final mix, confers better characteristics to the resulting composition with respect to the starting diesel base from the point of view of cold behaviour, with reference, in particular, to the CFPP parameter (cold filter plugging point) which is diminished by the presence of POAE.

It has now been unexpectedly found that, by mixing, in particular proportions, diesel fuels of an oil origin with components of a biological origin prepared by subjecting mixtures of biological origins, containing esters of fatty acids, to a hydrodeoxygenation and hydroisomerization treatment, a hydrocarbon composition is obtained, characterized by unexpected improvements from the point of view of cold behaviour, with respect to its components considered individually. These improvements do not only relate to the CFPP value, but, even more unexpectedly, they relate to the Cloud Point and Pour Point and are accompanied by improvements in the cetane number and density decreases.

In Italian patent application MI 2006A002193, filed on Nov. 15, 2006, the Applicant described a process for the production of hydrocarbon fractions useful as diesel fuel, starting from a mixture of a biological origin containing esters of fatty acids, possibly with aliquots of free fatty acids, by means of a process comprising the following steps:
1) hydrodeoxygenation of the mix of a biological origin;
2) hydroisomerization of the mix resulting from step (1), after possible water and gas flow separation, wherein said hydroisomerization is preferably carried out in the presence of a catalytic system comprising:
   a. a carrier of an acidic nature, comprising a completely amorphous micro-mesoporous silica-alumina, with a $SiO_2/Al_2O_3$ molar ratio ranging from 30 to 500, a surface area larger than 500 $m^2/g$, a pore volume ranging from 0.3 to 1.3 ml/g, an average pore diameter smaller than 40 Å,
   b. a metal component containing one or more metals of group VIII, possibly mixed with one or more metals of group VIB.

A particularly preferred aspect of the present invention relates to the use of hydrocarbon fractions thus prepared as component of a biological origin of the hydrocarbon compositions of the present invention: said fractions allow the best improvements to be obtained as far as cold behaviour of the resulting composition is concerned, with respect to its components considered individually, both with reference to the CFPP value and the Cloud Point and Pour Point values. At the same time, improvements are obtained relating to the cetane number and decrease in density.

An object of the present invention therefore relates to a hydrocarbon composition containing an oil component (A) and a component of a biological origin (B), wherein said component (B) is present in a quantity which can reach 75% by weight with respect to the total composition and wherein said component (B) is prepared starting from a mixture of a biological origin (C) containing esters of fatty acids, with possible aliquots of free fatty acids, by means of a process comprising the following steps:
1) hydrodeoxygenation of the mix of a biological origin;
2) hydroisomerization of the mix resulting from step (1), after possible water and gas flow separation, wherein said hydroisomerization is preferably carried out in the presence of a catalytic system comprising:
   a. a carrier of an acidic nature, comprising a completely amorphous micro-mesoporous silica-alumina, with a $SiO_2/Al_2O_3$ molar ratio ranging from 30 to 500, a surface area larger than 500 $m^2/g$, a pore volume ranging from 0.3 to 1.3 ml/g, an average pore diameter smaller than 40 Å,
   b. a metal component containing one or more metals of group VIII, possibly mixed with one or more metals of group VIB.

The compositions thus obtained can be suitably used as diesel fuel for engines and gas oil for heating systems.

The compositions can contain up to 75% by volume of the component of a biological origin (B) with respect to the total volume of the composition, even more preferably up to 40% by volume. Even a few percentage units of the component of a biological origin (B) can enhance the cold properties of the resulting mixture with respect to the single components. Generally speaking, the amount of biological component (B) will be regulated according to the amount of oil component (A), in terms of density and cold properties, in accordance with the qualitative constraints of a fuel.

The component of a biological origin (B) used in the hydrocarbon composition of the present invention, is preferably characterized by a density ranging from 750 to 800 $kg/m^3$; a viscosity ranging from 2.00 to 4.00 cSt; a cloud point ranging from −20 to +5° C.; a sulphur content lower than 3 mg/kg; a nitrogen content lower than 3 mg/kg; a water content lower than 50 mg/kg; an acidity lower than 0.1 mg KOH/g; a boiling range of 240 to 300° C. expressed as a boiling point of 10% by volume and 90% by volume in ASTM D86. The CFPP of the component of a biological origin preferably ranges from −25 to +5° C. The components of a biological origin (B) are prepared by means of the process comprising a hydrodeoxygenation step and a hydroisomerization step, from mixtures of biological origins (C) containing esters of fatty acids, with possible aliquots of free fatty acids, wherein said mixtures (C) can be of a vegetable or animal origin. The amount of fatty acids in the mixtures (C) can vary, for example, from 2 to 20% by weight with respect to the total mixture of a biological origin. Typically, the esters of fatty acids contained in said mixtures (C) are triglycerides of fatty acids, wherein the hydrocarbon chain of the fatty acid can contain from 12 to 24 carbon atoms and can be mono- or poly-unsaturated. The mixtures of a biological origin (C) can be selected from vegetable oils, vegetable fats, fish oils or mixtures thereof. Oils or vegetable fats can be sunflower oils, rape oil, canola oil, palm oil, soybean, hemp, olive, linseed oil, charlock, peanuts, castor oil, coconut oil or fatty oils contained in pine wood ("tall oil") or mixtures thereof. The animal oils or fats can be selected from lard, tallow, milk fats and mixtures thereof. Recycled oils and fats from the food industry can also be used, of both an animal and vegetable origin. The vegetable oils and fats can also derive from selected plants, by genetic engineering.

As far as the petroleum components (A) are concerned, all the known diesel cuts can be used in the hydrocarbon compositions of the present invention; petroleum components deriving from the mixing of diesel cuts of different origins and compositions, are also suitable.

The sulphur content of these diesel cuts preferably ranges from 2,000 to 50 mg/kg, even more preferably from 50 to 3 mg/kg.

Typical diesel cuts are medium distilled products, defined as oil cuts, preferably having a boiling point ranging from 180 to 380° C. Examples of these cuts can be gas oils from primary distillation, gas oils from vacuum distillation, thermal or catalytic cracking, such as, for example, the desulphurized gas oil cut coming from fluid bed catalytic cracking (light cycle oil (LCO)), fuels coming from a Fischer-Tropsch process or of a synthetic origin.

Cuts obtained from the above after hydrogenation treatment can also be used. By selecting the suitable component of a biological origin (B), the present invention generally also allows diesel cuts having very poor cp, cfpp, cetane number and density characteristics to be exploited for the preparation of the new hydrocarbon compositions.

According to another aspect of the present invention, mixtures containing one or more diesel cuts mixed with a desulphurized gas oil coming from fluid bed catalytic cracking (LCO), can be used as components of a petroleum origin (A). The hydrocarbon compositions of the present invention allow a low-value component to be up graded as gas oil.

The diesel cuts used in the compositions of the pre sent invention can have a density ranging from 830 to 910 kg/m$^3$ and a cetane number higher than 25. The cuts which can be used normally have a CFPP ranging from +8 to −15° C. Typically, these diesel cuts are those normally used as fuels in diesel engines or as gas oil for heating.

The composition, object of the present invention, can also contain additives for improving the cold behaviour, detergents, additives for improving the lubricity, anti-foam agents, cetane improvers, anti-rust agents, antioxidants, anti-wear agents, antistatic products. The concentration of each of these additives is preferably not higher than 1% by weight.

The hydrocarbon composition of the present invention is characterized by improved cold properties with respect to the same properties of the corresponding components selected individually. In particular, the presence of the biological component (B), even at low concentrations in the order of only a few units percentage, is unexpectedly capable of improving not only the CFPP, but also the cloud point and pour point of the diesel fuel as such. By the addition of this biological component (B) and in relation to its quality, a CFPP improvement can be obtained, with respect to that of the single components, ranging from 1 to 8° C. compared with the value of the component of a petroleum origin as such. The CFPP is measured by using the EN 116 method and corresponds to the temperature at which, and below which, the waxes contained in the fuel separate, causing flow problems through a particular filter. The cloud point of the hydrocarbon compositions of the present invention can vary, with respect to that of the single components, with an improvement of 1 to 6° C.

The cloud point is measured according to the method ASTM D2500.

The possibility of also using high amounts of the biological component (B) in the composition, is desirable from an environmental point of view and, contemporaneously, can allow other advantages to be obtained in addition to those already described, such as, for example, the necessity of using lower amounts of additives: for example, an improvement can be obtained in the cold and cetane properties without the use, or with the use in lower quantities, of the relative additives.

The compositions of the present invention can be prepared by the direct mixing of the components, preferably by means of mixing or incorporation of the component of a biological origin (B) in the component of a petroleum origin (A), in particular by the mixing or incorporation of the component (B) in the diesel cut or selected mix of diesel cuts. Possible further additives present in the final composition can be introduced either in the final composition or in the diesel cut, or in the component of a biological origin, before their mixing.

As far as the preparation of the biological component (B) used in the composition of the present invention is concerned, this includes subjecting a mixture of a biological origin (C), containing esters of fatty acids, and possibly also free fatty acids, to a hydrodeoxygenation step and an isomerization step, wherein the conditions for the hydrodeoxygenation and the hydroisomerization which can be used and the relative catalysts can all be products known to experts in the field. According to a preferred aspect, the hydrodeoxygenation step is carried out as described in the co-pending Italian patent application MI 2006A002193, whose paragraphs are provided hereunder and represent an integral part of the description of the invention according to the present patent application.

As far as the hydroisomerization step is concerned, this can be suitably effected in the presence of hydrogen at a pressure varying from 25 to 70 atm, and a temperature ranging from 250 to 450° C. Catalysts which can be suitably used are those containing one or more metals of group VIII, possibly in a mixture with one or more metals of group VI, appropriately supported.

Carriers suitable for the purpose consist of one or more metal oxides, preferably alumina, silica, titania, zirconia, and mixtures thereof. These catalysts are typically prepared by impregnation of the oxide carrier with a suitable salt solution of the metal(s). The impregnation is followed by a thermal treatment in a suitable atmosphere to decompose the precursor salt and obtain the supported metal. It is possible to proceed with subsequent impregnations in order to reach the desired metal charge level and also to differentiate, in the event of several metals, the carriers of the same. Processes are also known for the preparation of said catalysts instead of through impregnation, by precipitation of the metal precursor from a saline solution of the same metal on its carrier, or by co-precipitation of the various components of the catalyst, i.e. metal and carrier.

According to a particularly preferred aspect of the present invention, components of a biological origin (B) are used obtained by subjecting a mixture of a biological origin (C) containing esters of fatty acids and, possibly, free fatty acids, to a process comprising a hydrode-oxygenation step and an isomerization step, wherein a catalytic system is used in the hydroisomerization step, comprising:

a) a carrier of an acidic nature, comprising a micromesoporous silica-alumina completely amorphous, having a $SiO_2/Al_2O_3$ molar ratio ranging from 30 to 500, a surface area larger than 500 m$^2$/g, a pore volume ranging from 0.3 to 1.3 ml/g, an average pore diameter smaller than 40 Å.

b) a metal component containing one or more metals of group VIII, possibly mixed with one or more metals of group VIB.

These particular components (B) and the process for their preparation, are described in the co-pending Italian patent application MI 2006A002193, filed on Nov. 15, 2006 in the name of the Applicant, whose paragraphs are included hereunder to form an integral part of the description of the invention, according to the present patent application. The process described in Italian patent application MI2006A002193 allows hydrocarbon mixtures to be prepared, called, in the present application, components of a biological origin (B), by means of the hydrodeoxygenation of a mixture of a biological origin (C) containing esters of fatty acids, possibly with aliquots of free fatty acids, which can be vegetable oils such as sunflower oils, rape oil, canola oil, palm oil, or fatty oils contained in pine wood ("tall oil"), followed by hydroisomerization, which allows hydrocarbon mixtures to be obtained wherein the isoparaffin content can be higher than 80%, the remaining part being n-paraffins. In accordance with the above, said process produces a hydrocarbon fraction which can be used as diesel fuel, starting from a mixture of a biological origin, containing esters of fatty acids, possibly also containing free fatty acids, and comprises the following steps:

1) hydrodeoxygenation of the mix of a biological origin;
2) hydroisomerization of the mix resulting from step (1), after possible water and gas flow separation, wherein said hydroisomerization is preferably carried out in the presence of a catalytic system comprising:
   a) a carrier of an acidic nature, comprising a completely amorphous micro-mesoporous silica-alumina, with a $SiO_2/Al_2O_3$ molar ratio ranging from 30 to 500, a surface area larger than 500 m$^2$/g, a pore volume ranging from 0.3 to 1.3 ml/g, an average pore diameter smaller than 40 Å,
   b) a metal component containing one or more metals of group VIII, possibly mixed with one or more metals of group VIB.

As already mentioned, the mixtures of a biological origin (C) used in this preparation process, contain esters of fatty acids, possibly with aliquots of free fatty acids, and can be mixtures of an animal or vegetable origin. The aliquot of fatty acids can vary, for example, from 2 to 20% by weight, with respect to the total mixture of a biological origin. The esters of fatty acids contained in said mixtures are typically triglycerides of fatty acids, wherein the hydrocarbon chain of the fatty acid can contain from 12 to 24 carbon atoms and can be mono- or poly-unsaturated. The mixtures of a biological origin can be selected from vegetable oils, vegetable fats, animal fats, fish oils or mixtures thereof. The oils or vegetable fats can be sunflower oils, rape oil, canola oil, palm oil, soybean, hemp, olive, linseed oil, peanuts, castor oil, charlock oil, coconut oil or fatty oils contained in pine wood ("tall oil") or mixtures thereof. The animal oils or fats can be selected from lard, tallow, milk fats and mixtures thereof. Recycled oils and fats from the food industry can also be used, of both an animal or vegetable origin. The vegetable oils and fats can also derive from selected plants, by genetic engineering.

The mixtures of a biological origin (C), used in this preparation process, can also be mixed with other components before being fed to the process, for example, mixed with one or more hydrocarbons.

In the first step (step HDO) the mixture of a biological origin (C) is hydrodeoxygenated with hydrogen in the presence of a hydrodeoxygenation catalyst.

In this step, the hydrogenation of the double bonds present in the ester chains of the triglycerides takes place, together with the cracking of the triglyceride structure and deoxygenation both through decarboxylation and hydrogenation with the formation of water.

All hydrogenation catalysts known in the art, containing one or more metals selected from metals of group VIII and group VIB, suitably supported, can be used. Carriers suitable for the purpose consist of one or more metal oxides, preferably alumina, silica, titania, zirconia or mixtures thereof.

The metal or metals are preferably selected from Pd, Pt, Ni or from the pairs Ni—Mo, Ni—W, Co—Mo and Co—W, Ni—Mo and Co—Mo being preferred. These catalysts are typically prepared by means of impregnation of the oxidic carrier with a solution of a suitable salt of the metal or metals. The impregnation is then followed by a thermal treatment, in a suitable atmosphere, to decompose the precursor salt and obtain the supported metal. It is possible to proceed with subsequent impregnations, in order to reach the desired level of metal charge and also to differentiate their supporting, in the case of the presence of various metals. Processes are also known for the production of these catalysts, instead of through impregnation, by precipitation of the metal precursor from a saline solution of the metal itself on the carrier, or by co-precipitation of the various components of the catalyst, i.e. of the metal and carrier.

Catalytic compositions can also be used such as Ni—Mo—P on zeolite, Pd/zeolite, Pt/MSA, wherein MSA is a silica-alumina having particular characteristic described in EP 340868, EP 659478, EP 812804, and used as carrier also for the catalytic compositions used in the subsequent hydroisomerization step. Catalysts which can be suitably used in the HDO step are described, for example, in J. T. Richardson, "Principal of catalyst development", Plenum Press, New York, 1989, Chapter 6.

The catalysts of the type Ni—Mo, Ni—W, Co—Mo and Co—W preferably previously undergo sulphidation. The presulphidation procedure is effected according to the known techniques.

In order to maintain the catalyst in sulphided form, the sulphidation agent, for example, dimethyl disulphide, is fed together with the feedstock of a biological origin, after a possible purification step of said feedstock, in a quantity ranging from 0.02 to 0.5% by weight (140-3400 ppm S). Alternatively, the co-feeding can be effected of a "straight run" gas oil with a high S content (S>1%), in such a concentration as to reach the same total amount of S in the feedstock.

The HDO reaction is carried out in a reaction zone comprising one or more catalytic beds, in one or more reactors. According to a preferred aspect, it is effected in a typical fixed bed hydrotreating reactor. The stream of hydrogen and feedstock of a biological origin can be sent in equicurrent or countercurrent. The reactor can have adiabatic catalytic beds in a number higher than or equal to 2. As this is an exothermic reaction, with the production of heat, there will be a temperature rise in each catalytic bed. By the feeding, between one catalytic bed and another, of a stream of hydrogen and/or liquid feedstock at a defined temperature, it is possible to obtain a constant or increasing temperature profile. This operating procedure is normally indicated as "splitted feed".

As an alternative to an adiabatic layer reactor, resort can be made to a tube-bundle reactor. The catalyst is suitably charged inside the tubes, whereas a diathermic liquid (dowtherm oil) is sent to the mantle side with the aim of removing the reaction heat.

For a better regulation of the thermal profile in the reactor, whether this be with adiabatic layers or tube-bundle, the reactor itself can be run with the recirculation of a part of the effluents, according to the typology known as recycling reactor. The function of the recycling is to dilute the fresh feedstock in the reactor thus limiting the thermal peaks due to the exothermicity of the reaction. The recycling ratio, i.e. the amount of recirculated fraction with respect to the fresh feedstock can vary from 0.5 to 5 w/w.

A further reactor configuration which can be used for this application is a slurry reactor in which the hydrodeoxygenation catalyst is suitably formed in microspheres and dispersed in the reaction environment. The gas-liquid-solid mixing in this case can be favoured by mechanical stirring or by forced recirculation of the reaction fluids.

The HDO step is preferably carried out at a pressure varying from 25 to 70 bar, preferably from 30 to 50 bar, and at a temperature ranging from 240 to 450° C., preferably from 270 to 430° C. It is preferable to operate with an LHSV ranging from 0.5 to 2 hours$^{-1}$, even more preferably from 0.5 to 1 hours$^{-1}$. The H$_2$/mixture of a biological origin ratio preferably ranges fro 400 to 2,000 Nl/l.

Before the HDO step, the charge of a biological origin (C) can be suitably treated in order to remove the content of alkaline metals (for example Na, K) and alkaline earth metals (for example Ca), possibly contained in the feedstock. This pretreatment can be carried out by adsorption on a suitable material: for example the known percolation techniques can be used on a column filled with acid earth or clays such as for example montmorillonites, bentonites, smectites, acidic sepiolites. For this purpose, the products available on the market such as Filtrol, Tonsil, Bentolites H and L, SAT-1, can be used.

Alternatively, ion exchange resins can be used, or slightly acidic washings obtained for example by contact with sulphuric acid, nitric acid or hydrochloric acid, preferably at room temperature and atmospheric pressure.

The effluents of the HDO step (1) are preferably subjected to purification treatment before being sent to the subsequent hydroisomerization step. The purification treatment can comprise a separation step and a washing step. According to this preferred aspect, the effluents of step (1) are sent to a high pressure gas-liquid separator. A gaseous phase, essentially consisting of hydrogen, water, CO and CO$_2$ and light paraffins (C$_4$$^-$), is recovered. NH$_3$, PH$_3$ and H$_2$S can also be present in small quantities. After separation, the gaseous phase is cooled and the water (possibly containing traces of alcohols and carboxylic acids) and condensable hydrocarbons are separated by condensation. The remaining gaseous phase is purified to allow the recycling of hydrogen to the reaction step (1). Methods of the known art are adopted for the purification, by means of caustic washings, for example with aqueous solutions of NaOH or Ca(OH)$_2$, or by means of the well-known purification technique with amines (for example MEA, monoethanolamine, or DEA, diethanolamine). At the end of the purification the CO$_2$, H$_2$S, PH$_3$ and NH$_3$ are removed and the gaseous fraction thus obtained essentially consists of H$_2$ with possible traces of CO. In order to limit the accumulation of CO in the recycled gases, it can be removed by cuproammonia washing or by methanation, according to technologies known to experts in the field.

The liquid phase separated in the high pressure separator consists of a hydrocarbon fraction, essentially consisting of linear paraffins with a number of carbon atoms varying from 14 to 21, prevalently from 15 to 19. Depending on the operating conditions of the separator, the liquid fraction can contain small quantities of H$_2$O and oxygenated compounds, such as for example alcohols and carbonyl compounds. The residual S can be lower than 10 ppm. The liquid fraction can then be washed with a gaseous hydrocarbon, for example CH$_4$, or nitrogen or hydrogen, in a stripper, in order to further reduce the water content.

The resulting hydrocarbon mixture is fed to the subsequent hydroisomerization step (2). The hydroisomerization step is carried out in the presence of hydrogen and a catalytic composition which comprises:

a) a carrier of an acidic nature comprising a completely amorphous micro-mesoporous silica-alumina having a SiO$_2$/Al$_2$O$_3$ molar ratio ranging from 30 to 500, a surface area greater than 500 m$^2$/g, a pore volume ranging from 0.3 to 1.3 ml/g, an average pore diameter lower than 40 Å, b) a metal component containing one or more metals of group VIII, possibly mixed with one or more metals of group VIB.

The carrier of an acidic nature (a) of the catalytic composition used in the present invention comprises a silica-alumina preferably having a SiO$_2$/Al$_2$O$_3$ molar ratio ranging from 50 to 300.

According to a preferred aspect, the carrier of an acid nature (a) comprises a silica-alumina with a porosity ranging from 0.3 to 0.6 ml/g.

Completely amorphous micro-mesoporous silica-aluminas, which can be used as carrier (a) of the catalytic compositions of the hydroisomerization step of the present invention, are described in U.S. Pat. No. 5,049,536, EP 659478, EP 812804, and called MSA. Their powder XRD pattern does not have a crystalline structure and does not show any peak. U.S. Pat. No. 5,049,536, EP 659478, EP 812804 also describe various methods for preparing silica-aluminas suitable as carrier (a). Silica-aluminas which can be used for example for the process of the present invention can be prepared, in accordance with EP 659478, starting from tetra-alkylammonium hydroxide, an aluminium compound which can be hydrolyzed to Al$_2$O$_3$, and a silicon compound which can be hydrolyzed to SiO$_2$, wherein said tetra-alkylammonium hydroxide is a tetra(C$_2$-C$_5$)alkylammonium hydroxide, said hydrolyzable aluminium compound is an aluminum tri(C$_2$-C$_4$)alkoxide and said hydrolysable silicon compound is a tetra(C$_1$-C$_5$)alkylorthosilicate: these reagents are subjected to hydrolysis and gelification operating at a temperature equal to or higher than the boiling point, at atmospheric pressure, of any alcohol which is developed as by-product of said hydrolysis reaction, without the elimination or substantial elimination of said alcohols from the reaction environment. The gel thus produced is dried and calcined, preferably in an oxidizing atmosphere at a temperature ranging from 500 to 700° C., for a period of 6-10 hours. It is preferable to operate by preparing an aqueous solution of the tetra-alkylammonium hydroxide and aluminium trialkoxide and the tetra-alkylorthosilicate is added to said aqueous solution, operating at a temperature lower than the hydrolysis temperature, with a quantity of the reagents which is such as to respect the SiO$_2$/Al$_2$O$_3$ molar ratio of 30/1 to 500/1, the tetra-alkylammonium hydroxide/ $SiO_2$ molar ratio of 0.05/1 to 0.2/1 and $H_2O/SiO_2$ molar ratio of 5/1 to 40/1, the hydrolysis and gelification is caused by heating to a temperature higher than approximately 65° C. up to about 110° C., operating in an autoclave at the autogenous pressure of the system, or at atmospheric pressure in a reactor equipped with a condenser.

According to EP 812804, silica-aluminas which can be used as component (a) of the catalytic composition for the hydroisomerization step can be prepared by means of a process which comprises:
preparing a mixture starting from a tetra-alkylorthosilicate, a $C_3$-$C_6$ alkyl alcohol or dialcohol, a tetra-alkylammonium hydroxide having the formula $R_1(R_2)_3$NOH wherein $R_1$ is a $C_3$-$C_7$ alkyl and $R_2$ is a $C_1$ or $C_3$-$C_7$ alkyl, in the presence of a hydrolysable aluminium compound, wherein the molar ratios fall within the following ranges:

alcohol/$SiO_2 \leq 20$
$R_i(R_2)_j NOH/SiO_2 = 0.05$-$0.4$
$H_2O/SiO_2 = 1$-$40$
$Al_2O_3/SiO_2$ greater than 0 and less than 0.02
subjecting said mixture to hydrolysis and subsequent gelification at a temperature close to the boiling point of the alcohol or mixture of alcohols present;
subjecting the gel obtained to drying and calcination.

The carrier of an acidic nature (a) of the catalyst which is used in the process of the present invention can be in the form of an extruded product containing traditional binders, such as for example aluminium oxide, bohemite or pseudobohemite. The extruded product can be prepared according to techniques well-known to experts in the field. The silica-alumina and the binder can be premixed in weight ratios ranging from 30:70 to 90:10, preferably from 50:50 to 70:30. At the end of the mixing, the product obtained is consolidated into the desired end-form, for example extruded pellets or tablets. According to a preferred embodiment the methods and binders described in EP 550922 and EP 665055 can be used, the latter being preferred, whose contents are incorporated herein as reference.

A typical preparation method of the component of an acidic nature (a) in the form of an extruded product (EP 665055) comprises the following steps:
(A) preparing an aqueous solution of a tetra-alkylammonium hydroxide (TAA-OH), a soluble aluminium compound capable of hydrolyzing in $Al_2O_3$ and a silicon compound capable of hydrolyzing to $SiO_2$, in the following molar ratios:
$SiO_2/Al_2O_3$ from 30/1 to 500/1
TAA-OH/$SiO_2$ from 0.05/1 to 0.2/1
$H_2O/SiO_2$ from 5/1 to 40/1
(B) heating the solution thus obtained to cause its hydrolysis and gelification and obtain a mixture A with a viscosity ranging from 0.01 to 100 Pa sec;
(C) adding to the mixture A, first a binder belonging to the group of bohemites or pseudo-bohemites, in a weight ratio with the mixture A ranging from 0.05 to 0.5, and subsequently a mineral or organic acid in a quantity ranging from 0.5 to 8.0 g per 100 g of binder;
(D) heating the mixture obtained under point (C) to a temperature ranging from 40 to 90° C., until a homogeneous paste is obtained, which is subjected to extrusion and granulation;
(E) drying and calcining the extruded product in an oxidizing atmosphere.

Plasticizing agents, such as methylcellulose, are preferably also added in step (C) to favour the formation of a homogeneous and easily processable paste.

In this way a granular acid carrier is obtained, preferably containing a quantity ranging from 30 to 70% by weight of inert inorganic binder, the remaining quantity consisting of amorphous silica-alumina essentially having the same characteristics with respect to porosity, surface extension and structure described above for the same silica-alumina without a binder.

With respect to the metals contained in the metallic component (b) of the catalytic compositions used in the hydroisomerization step of the process of the present invention, this is selected from metals of group VIII, optionally mixed with one or more metals of group VIB. Compositions containing only metals of group VIII are preferred. The metal or metals of group VIII are preferably selected from Pt, Pd, Ni and Co. In particular, when the metallic component contains only metals of group VIII, the metal or metals are preferably selected from Pt, Pd and Ni. When the metallic component contains both one or more metals of group VIII and one or more metals of group VIB, the metal of group VIII is preferably selected from Ni and Co. The metal of group VIB is preferably selected from Mo and W.

The metal of group VIII is preferably in a quantity ranging from 0.1 to 5% by weight with respect to the total weight of the catalytic composition. The metal of group VIB, when present, is in a quantity ranging from 1 to 50, even more preferably in a quantity ranging from 5 to 35% by weight with respect to the total weight of the catalytic composition. The weight percentage of the metal, or metals, refers to the metal content expressed as a metal element; in the final catalyst, after calcination, said metal is in the form of an oxide.

The metals of group VIII, and optionally group VI, contained in the catalytic composition used in the hydroisomerization step (2) can be deposited onto the carrier (a) with all the techniques known to experts in the field. Catalytic compositions which can be well used in the hydroisomerization step of the present invention containing one or more metals of group VIII, and their preparations, are described in EP 582347, EP 1101813 and WO 2005/103207.

In particular, EP 582347 describes catalytic compositions, which can be used in the hydroisomerization of n-paraffins, containing one or more metals of group VIII and a carrier of silica gel and alumina amorphous to X-rays, with a $SiO_2/Al_2O_3$ molar ratio ranging from 30 to 500, a surface area within the range of 500 to 1000 $m^2/g$, a pore volume ranging from 0.3 to 0.6 ml/g and a pore diameter prevalently within the range of 10 to 30 Å. EP 1101813 describes catalytic compositions, which can be used for the preparation of medium distillates, containing one or more metals of group VIII and a carrier of silica gel and calcined alumina, amorphous to X-rays, with a $SiO_2/Al_2O_3$ molar ratio ranging from 30 to 500, a surface area within the range of 500 to 1000 $m^2/g$, a pore volume ranging from 0.2 to 0.8 ml/g and an average pore diameter within the range of 10 to 40 Å.

WO 2005/103207 describes catalytic compositions which can be used for the upgrading of distillates, containing one or more metals selected from Pt, Pd, Ir, Ru, Rh and Re and a silica-alumina carrier, amorphous to X-rays, with a $SiO_2/Al_2O_3$ molar ratio ranging from 30 to 500, a surface area greater than 500 $m^2/g$, a pore volume ranging from 0.3 to 1.3 ml/g and an average pore diameter less than 40 Å.

In general, in the compositions used in the hydroisomerization step (2), containing only the metal of group VIII, the metal, according to the preparations described in the patents indicated above, can be introduced by means of impregnation or ion exchange. According to the first technique, the component of an acidic nature (a), also in extruded form, and preferably in the extruded form prepared according to the process described in EP 665055, is wet with an aqueous solution of a compound of the metal of group VIII, operating for example at room temperature, and at a pH ranging from 1 to 4. The aqueous solution preferably has a concentration of metal expressed as g/l ranging from 0.2 to 2.0. The resulting product is dried, preferably in air, at room temperature, and is calcined in an oxidizing atmosphere at a temperature ranging from 200 to 600° C.

In the case of alcohol impregnation, the acid component (a), also in extruded form, and preferably in the extruded form prepared according to the process described in EP 665055, is suspended in an alcohol solution containing the metal. After impregnation the solid is dried and calcined.

According to the ion exchange technique, the acid component (a), also in extruded form, and preferably in the extruded form prepared according to the process described in EP 665055, is suspended in an aqueous solution of a complex or salt of the metal, operating at room temperature and a pH ranging from 6 to 10. After the ion exchange, the solid is separated, washed with water, dried and finally thermally treated in an inert and oxidizing atmosphere. Temperatures which can be used for the purpose are those ranging from 200 to 600° C.

Compounds of metals which can be well used in the preparations described above are: $H_2PtCl_6$, $Pt(NH_3)_4(OH)_2$, $Pt(NH_3)_4Cl_2$, $Pd(NH_3)_4(OH)_2$, $PdCl_2(CH_3COO)_2Ni$, $(CH_3COO)_2Co$. When the catalytic composition comprises more than one metal of group VIII the impregnation is carried out as follows: the acidic component (a), also in extruded form, and preferably in the extruded form prepared according to the process described in EP665055, is wet with a solution of a compound of a first metal, the resulting product is dried, it is optionally calcined, and is impregnated with a solution of a compound of a second metal. The product is dried and is then calcined in an oxidizing atmosphere at a temperature ranging from 200 to 600° C. Alternatively a single aqueous solution containing two or more compounds of different metals can be used for contemporaneously introducing said metals.

Before being used, the catalyst is activated by the known techniques, for example by means of a reduction treatment, and preferably by means of drying and subsequent reduction. The drying is effected in an inert atmosphere at temperatures ranging from 25 to 100° C., whereas the reduction is obtained by thermal treatment of the catalyst in a reducing atmosphere ($H_2$) at a temperature ranging from 300 to 450° C., and a pressure preferably ranging from 1 to 50 bar. Catalytic compositions which can be well used in the hydroisomerization step of the present invention containing one or more metals of group VIII and additionally one or more metals of group VIB, and their preparations, are described in EP 908231 and EP 1050571. In particular, EP 908231 describes catalytic compositions containing a mixture of metals belonging to groups VIB and VIII and a carrier of silica gel and alumina amorphous to X-rays, with a $SiO_2/Al_2O_3$ molar ratio ranging from 30 to 500, a surface area within the range of 500 to 1000 m²/g, a pore volume ranging from 0.3 to 0.6 ml/g and an average pore diameter within the range of 10 to 40 Å. When the hydroisomerization catalyst also contains a metal of group VIB in the metal phase (b), the catalyst can be prepared by means of aqueous or alcohol impregnation. More specifically, according to a first technique, the silica-alumina, also in extruded form, and preferably in the extruded form prepared according to the process described in EP 665055, is wet with an aqueous solution of a compound of the desired metal of group VIB, operating at room temperature or a temperature close to room temperature. After aqueous impregnation, the solid is dried and then a new impregnation is effected with an aqueous solution of a compound of the desired metal of group VIII. After aqueous impregnation, the solid is dried again and thermally treated in an oxidizing atmosphere. Suitable temperatures for this thermal treatment range from 200 to 600° C. The aqueous impregnation of the metallic phase can also be effected in a single step, wherein the silica-alumina-based acidic carrier is wet with a single aqueous solution containing both of the metal compounds of groups VIB and VIII, subsequently proceeding with the same operating procedures described above. In the alcohol impregnation technique, the silica-alumina, also in extruded form, and preferably in the extruded form prepared according to the process described in EP 665055, is suspended in an alcohol solution of a compound of a metal of group VIB and a compound of a metal of group VIII, operating at room temperature or a value close to room temperature. After impregnation the solid is dried, preferably in air, at a temperature of about 100° C. and thermally treated in an oxidizing atmosphere, preferably in air.

The final hydroisomerization catalyst can be formulated and formed in extruded products having different forms (for example cylindrical, trilobated, etc.) as described for example in EP 1101813.

The catalytic compositions used in the hydroisomerization step of the present invention have the characteristic of being resistant to water: a water-inhibiting effect can be observed on the catalytic activity which can be recuperated however by increasing the temperature, whereas no irreversible deactivation was detected. An increase of a few ° C., from 3 to 5, is typically sufficient for recovering the fall in activity caused by 1000-2000 ppm of $H_2O$ in the hydrocarbon charge. It is preferable to operate with a water content around 1000 ppm, even more preferably at a level lower than 300 ppm.

The reactor configuration for the hydroisomerization step is a fixed bed reactor. The thermal control in this case is not critical as the reaction is slightly exothermic. For this reason an adiabatic layer reactor is suitable. In any case, a tube bundle reactor can also be used.

The liquid charge deriving from the hydrodeoxygenation step can be sent into the reactor in equicurrent or in counter current with respect to the hydrogen. The counter current procedure is preferred when the liquid charge contains a significant level of water and/or oxygenated compounds not converted in the first step of the process (>300 ppm of oxygen).

The water present, or formed by the oxygenated compounds during the hydroisomerization, is therefore removed in gaseous phase in the first part of the catalytic bed, thus reducing the contact time with the rest of the catalyst. A particularly preferred arrangement for this catalytic step is a reactor with a number of layers greater than or equal to 2, in which the first layer covered by the liquid hydrocarbon stream deriving from the hydrodeoxygenation step, therefore corresponding to the last layer covered by the gaseous hydrogen stream, consists not of the catalyst, but of a filler of structures of inert material, for example ceramic or stainless steel, or pellets or spherules of inert material, such as pumice, alpha-alumina, glass. The role of the filler is to favour the gas-liquid contact, as the hydrocarbon charge to be isomerized will encounter the gaseous hydrogen stream before flowing onto the catalytic bed, thus being further anhydrified.

The hydroisomerization can be effected at a temperature ranging from 250 to 450° C., preferably from 280 to 380° C., and at a pressure ranging from 25 to 70 bar, preferably from 30 to 50 bar. It is preferable to operate at an LHSV ranging from 0.5 to 2 hours$^{-1}$. The $H_2$/HC ratio preferably ranges from 200 to 1000 Nl/l.

The reaction conditions can be suitably selected to obtain a product whose characteristics are balanced in relation to the cold properties of the diesel cut, with which the hydroisomerization product is subsequently mixed to prepare the hydrocarbon compositions of the present invention.

The mixture resulting from the hydroisomerization step is subjected to distillation to obtain a purified hydrocarbon mixture which can be used as diesel fuel, which is used as component of a biological origin (B) in the new hydrocarbon compositions of the present invention, having improved cold properties.

Figure 1:
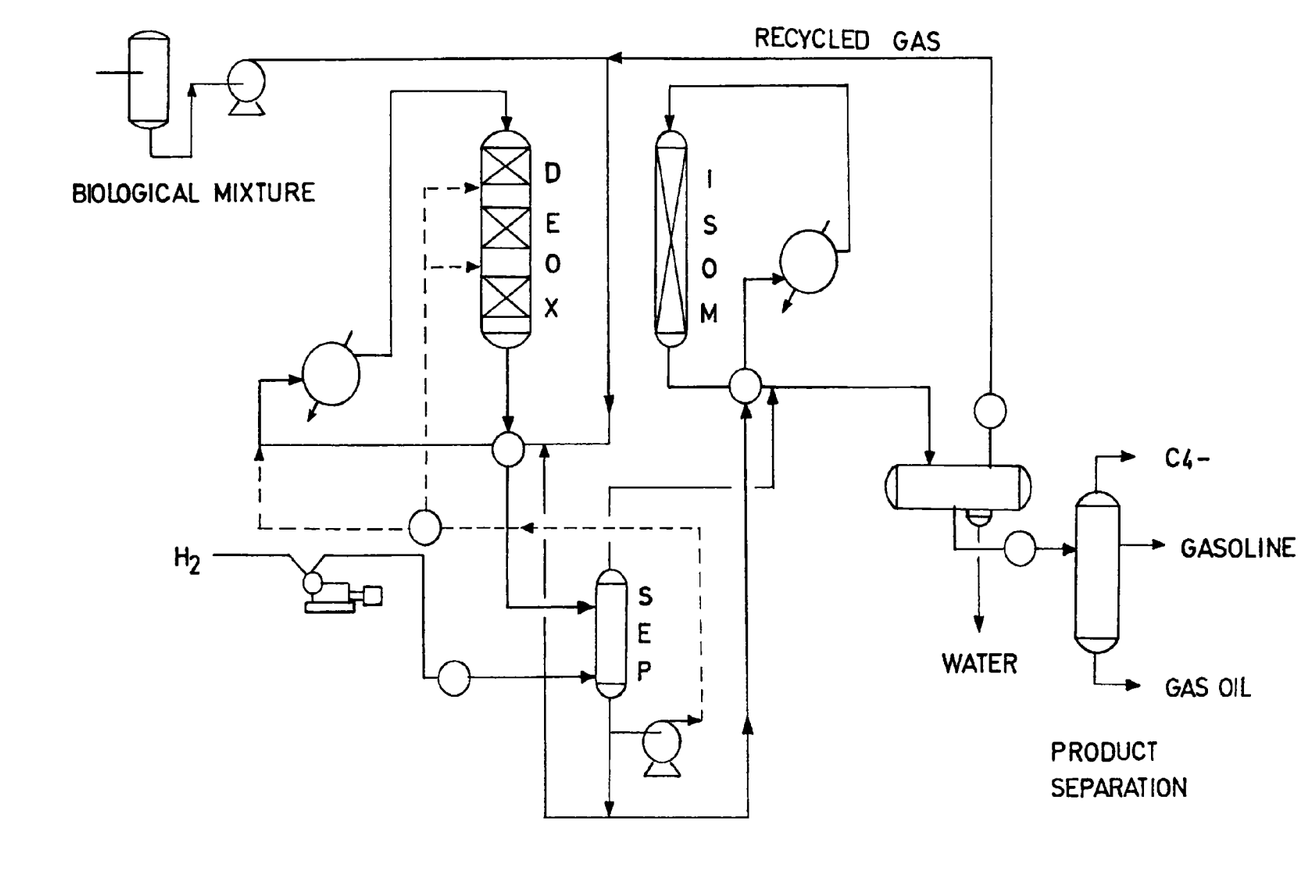

FIG. 1 illustrates a plant scheme which can be used in the process of the present invention for producing hydrocarbon fractions which can be used as diesel fuel, starting from a mixture of a biological origin (C) (biological mixture) containing esters of fatty acids and optionally amounts of free fatty acids. The scheme of FIG. 1 is in accordance with what is described above in relation to the hydrodeoxygenation (DEOX reactor), purification by means of a high pressure separator and washing (SEP) and hydroisomerization (ISOM reactor) steps. In the scheme, after the hydroisomerization reactor, there are also the subsequent separation steps, by means of a separator and distiller, to isolate the gas oil obtained. The dashed line represents a possible recycling of the effluent deriving from the first step.

Some practical embodiment examples of the process object of the present invention are provided for a more detailed description for purely illustrative purposes of particular aspects of the invention, which however can in no way be considered as limiting the overall scope of the invention itself.

EXAMPLE 1

Preparation of the Catalyst Pt/MSA Reagents and Materials

The following commercial reagents were used in the preparation described hereunder:

| | |
|---|---|
| tetrapropylammonium hydroxide (TPA-OH) | SACHEM |
| aluminium tri-isopropoxide | FLUKA |
| tetra-ethylsilicate | DYNAMIT NOBEL |
| alumina (VERSAL 250, Pseudo-Boehmite) | LAROCHE |
| methylcellulose (METHOCEL) | FLUKA |

The reagents and/or solvents used and not indicated above are those most widely used and can be easily found at normal commercial operators specialized in the field.

PREPARATIVE EXAMPLES (i) Preparation of the Silica-Alumina Gel

A 100 litre reactor was preliminarily washed with 75 litres of a solution at 1% by weight of tetrapropylammonium hydroxide (TPA-OH) in demineralised water, maintaining the liquid under stirring for 6 hours at 120° C. The washing solution is discharged and 23.5 litres of demineralised water, 19.6 kg of an aqueous solution at 14.4% by weight of TPA-OH (13.8 moles) and 600 g of aluminium tri-isopropoxide (2.94 moles) are introduced. The mixture is heated to 60° C. and kept under stirring at this temperature for 1 hour, in order to obtain a limpid solution. The temperature of the solution is then brought to 90° C. and 31.1 kg of tetra-ethylsilicate (149 moles) are rapidly added. The reactor is closed and the stirring rate is regulated to about 1.2 m/s, maintaining the mixture under stirring for three hours at a temperature ranging from 80 to 90° C., with thermostat-regulated control to remove the heat produced by the hydrolysis reaction. The pressure in the reactor rises to about 0.2 MPag. At the end, the reaction mixture is discharged and cooled to room temperature, obtaining a homogeneous and relatively fluid gel (viscosity 0.011 Pa·s) having the following composition molar ratios:

$SiO_2/Al_2O_3$=101
TPA-OH/$SiO_2$=0.093
$H_2O/SiO_2$=21 ii) Preparation of the Extruded Product 1150 g of alumina (VERSAL 150), previously dried for 3 hours in air at 150° C., and 190 g of methylcellulose, are charged into a 10 litre plough mixer, maintained at a stirring rate of 70-80 revs per minute. 5 kg of the silica-alumina gel prepared as described above and left to rest for about 20 hours are then added over a period of time of about 15 minutes, and the mixture is left under stirring for about 1 hour. 6 g of glacial acetic acid are added and the temperature of the mixer is brought to about 60° C., subsequently continuing the stirring until a homogeneous paste is obtained, having the desired consistency for the subsequent extrusion.

The homogenous paste obtained as described above is charged into a HUTT extruder, extruded and cut into pellets having the desired size (about 2×4 mm). The product is left to rest for about 6-8 hours and then dried maintaining it in a stream of air at 100° C. for 5 hours. It is finally calcined in a muffle at 550° C. for 3 hours in a flow of nitrogen and for a further 8 hours in air.

A porous solid with acid characteristics is thus obtained, essentially consisting of silica/alumina (yield 951 with respect to the respective initial reagents), having a BET of 608 m$^2$/g.

iii) Impregnation of the Carrier with Platinum 12.1 ml of an aqueous solution of hydrochloric acid 0.6 M containing 4.5 g/l of hexachloroplatinic acid ($H_2PtCl_6$, 0.133 mmoles) are dripped under slow stirring into a glass recipient containing 10 g of the porous solid prepared as described above. The mixture thus obtained is left under stirring for 16 hours at room temperature. The water is then evaporated at 60° C. in a stream of air, over a period of about 1 hour. The solid obtained is then dried maintaining it at 150° C. for two hours, and calcined by heating in a muffle, in a stream of air, from room temperature to 500° C. over a period of three hours. At the end, a supported catalyst is obtained, which is used in the hydroisomerization step described in example 3 below, having the following characteristics:

59.8% by weight of amorphous silica-alumina ($SiO_2/Al_2O_3$ molar ratio=102)
39.9% by weight of alumina (pseudo-bohemite)
0.3% by weight of platinum
Pore volume: 0.6 ml/g
BET: 600 m$^2$/g
Crushing strength: 10 kg/cm (radial); 90 kg/cm$^2$ (axial)

EXAMPLE 2

Hydrodeoxygenation Step (HDO)

The experimentation is carried out in a continuous reactor fed with soya oil having the characteristics indicated in Table 1 (refined soya oil Sipral) or palm oil having the characteristics shown in table 1.

The vegetable oil is fed to the first step with hydrogen in equicurrent in the presence of the commercial hydrogenation catalyst UOP UF 210 based on $NiMo/Al_2O_3$ in sulphide form. The sulphidation of the catalyst is effected in situ using gas oil containing dimethyldisulphide (DMDS) in a concentration which progressively varies from 3 to 9% by weight, at a temperature progressively varying within the range of 230 to 370° C. and a pressure of 70 bar, with a $H_2$/gas oil ratio of 1300 Nl/l and LHSV of 0.8 hours$^{-1}$. The vegetable oil is fed to the reactor in the presence of a small quantity of DMDS (0.025%) to keep the catalyst in sulphide form.

The feedstock and hydrogen flow into the reactor in a descending mode.

The operating conditions used are the following:
Average temperature: 340-350° C.
LHSV: 1 hour$^{-1}$
Pressure: 35 bar
$H_2$/oil: 1500 Nl/l

TABLE 1

|  | Refined Soya Oil | Refined Palm Oil |
|---|---|---|
| Palmatic acid %* (C16-0) | 13.06 | 41.41 |
| Stearic acid %* (C18-0) | 0.84 | 2.55 |
| Oleic acid %* (C18-1) | 27.09 | 42.17 |
| Linoleic acid %* (C18-2) | 53.63 | 8.21 |
| Linolenic acid %* (C18-3) | 5.11 | 3.51 |
| Arachidic acid % (C20-0) | 0.07 | 0.07 |
| Acidity (mgKOH/g) | 0.11 | 1.2 |
| $H_2O$ (ppm) | 2200 | 600 |
| Na (ppm) | 0.3 | 2.6 |
| K (ppm) | 0.3 | 0.6 |
| Ca (ppm) | 0.3 | 0.6 |
| Mg (ppm) | 0.1 | 0.1 |
| Al (ppm) | <0.1 | <0.1 |
| P (ppm) | 0.65 | 0.25 |
| Fe (ppm) | <0.1 | 0.2 |
| Cu (ppm) | <0.1 | <0.1 |

*The first number in brackets indicates the carbon atoms, the second the unsaturations.

The effluent product is separated in a gas/liquid separator from the gaseous fraction consisting of $H_2$, $CO/CO_2$ and light hydrocarbons almost totally consisting of $C_3H_8$.

The liquid product, after the separation of water, consists of n-paraffins, whose characteristics and distribution are indicated in Table 2 below.

TABLE 2

|  | Hydrodeoxyg. from soya oil | Hydrodeoxyg. from palm oil |
|---|---|---|
| Density (g/ml) | 0.7916 | 0.7848 |
| Carbon (% w/w) | 84.64 | 84.96 |
| Hydrogen (% w/w) | 14.83 | 14.92 |
| Nitrogen (ppm) | <1 | <1 |
| Sulphur (ppm) | 3 | <1 |
| Oxygen (by difference, %) | 0.5 | 0.12 |
| $H_2O$ (after anhydrification, ppm) | 100 | 20 |
| Mono aromatic compounds (%) | 2.9 | 0.2 |
| Di aromatic compounds (%) | 0.5 | <0.1 |
| Tri aromatic compounds (%) | 0.1 | <0.1 |
| Total aromatic compounds (%) | 3.5 | 0.2 |
| Cloud point | 21 | 19 |
| Gasoline in the feedstock (180° C., %) | 0 | 0 |
| Gas oil in the feedstock (180-380° C., %) | 96 | 99 |
| Heavy products in the feedstock (340+° C., %) | 5 | 2 |
| Heavy products in the feedstock (380+° C., %) | 4 | 1 |
| Simulated distillation (ASTM D2887) | | |
| Initial boiling point, ° C. | 173 | 235 |
| 2% | 269 | 270 |
| 5% | 272 | 271 |
| 10% | 288 | 272 |
| 50% | 309 | 303 |
| 90% | 324 | 320 |
| 95% | 351 | 320 |
| 98% | 412 | 341 |
| Final boiling point, ° C. | 462 | 422 |
| Paraffin distribution (w %) | | |
| total n-paraffins | 90.92 | 98.93 |
| n-paraffins C11- | 0.85 | 0.16 |
| n-paraffins C12-C20 | 87.7 | 98.47 |
| n n-paraffins C20+ | 2.4 | 0.3 |
| Linear paraffin distribution (weight %) | | |
| C14 | 0.19 | 0.7 |
| C15 | 6.99 | 15.06 |
| C16 | 4.32 | 27.19 |
| C17 | 47.29 | 20.17 |
| C18 | 27.8 | 34.09 |
| C19 | 0.64 | 0.32 |
| C20 | 0.39 | 0.36 |

EXAMPLE 3

Hydroisomerization Step

The product obtained in the deoxygenation step described in example 2, containing 100 ppm of residual $H_2O$, is treated in equicurrent with hydrogen in the presence of the Pt/MSA catalyst prepared in the previous example 1. The operating conditions used are indicated in Table 3

TABLE 3

|  | Hydrodeoxygenated product from soya oil | Hydrodeoxygenated product from palm oil |
|---|---|---|
| Temperature | 345° C. | 360° C. |
| LHSV | 2 hours$^{-1}$ | 2 hours$^{-1}$ |
| Pressure | 35 bar | 35 bar |
| $H_2$/HC | 1000 Nl/l | 1000 Nl/l |
| catalyst ageing | 200-300 hours | 1700-2000 hours |

The effluent from the hydroisomerization reactor consists of a gaseous phase and a liquid phase, the two phases are separated in a gas/liquid separator, the gaseous phase analyzed via GC consists of $C_3/C_4$ light paraffins (LPG), whereas the liquid phase separated, containing paraffins with a number of carbon atoms ranging from 5 to 20, is analyzed by means of GC to evaluate the isomerization degree, which, under these operating conditions is 70% for the product deriving from the soya oil and 80% for the product deriving from the palm oil, and used to evaluate the distillation curve.

The hydrocarbon product is then sent to a distillation column in order to separate the gasoline fraction (10% by weight for the product deriving from the soya oil, 19.8 for the product deriving from the palm oil) from the diesel fraction (90% by weight for the product deriving from the soya oil, 81.2% by weight for the product deriving from the palm oil). This latter fraction, containing paraffins with a number of carbon atoms ranging from 12 to 20, was characterized and the main properties are indicated in Table 4 below:

TABLE 4

| Property | Method | Hydroisomer. from soya oil | Hydroisomer. from palm oil |
|---|---|---|---|
| Density @ 15° C. (kg/m³) | ASTM D4052 | 783.9 | 777.7 |
| Sulphur (mg/kg) | EN ISO 20846 | <3 | <3 |
| Nitrogen (mg/kg) | ASTM 4629 | 1 | <0.3 |
| Isoparaffin content (w %) | Gaschromatog. | 70 | 80 |
| Total aromatic compounds | EN 12916 | <1 | <1 |
| Cloud point (° C.) | ASTM D2500 | −1.4 | −15.2 |
| Cold filter plugging point ° C. | EN 116 | −5 | −16 |
| Pour point (° C.) | ASTM D6892 | −3 | −15 |
| Viscosity at 40° C. (cSt) | ASTM D445 | 3.093 | 2.627 |
| Acidity (mg KOH/g) | ASTM 664 | <0.1 | <0.1 |
| Bromine number | ISO 3829 | <0.1 | <0.1 |
| Water (mg/kg) | EN ISO 12937 | 30 | 10 |
| Cetane number | EN ISO 5165 | >76 | >76 |
| CI4 | EN ISO 4264 | 93 | 90 |
| IQT | pr EN 15195 | 84 | — |
| Distillation (° C.) | ASTM D86 | | |
| Ibp | | 239 | 221 |
| T5 | | 262 | 238 |
| T10 | | 267 | 246 |
| T20 | | 274 | 255 |
| T30 | | 279 | 262 |
| T40 | | 283 | 267 |
| T50 | | 285 | 271 |
| T60 | | 287 | 274 |
| T70 | | 289 | 277 |
| T80 | | 291 | 280 |
| T90 | | 295 | 285 |
| T95 | | 300 | 289 |
| Fbp | | 314 | 294 |

The fractions thus obtained are used in the following examples, as components of a biological origin, for preparing hydrocarbon compositions in accordance with the present invention.

EXAMPLE 4

The diesel cuts used for preparing compositions according to the present invention, are listed and described in the following tables 5 and 6.

TABLE 5

| Diesel cut mark | Diesel cut description |
|---|---|
| A | desulphurized SR gas oil |
| B | industrial desulphurized gas oil at high density |
| C | industrial desulphurized gas oil at low density |
| D | industrial gas oil including components from cracking |
| E | desulphurized LCO |
| F | 0.89 B + 0.11 E |
| G | 0.89 C + 0.11 E |
| H | 0.89 D + 0.11 E |
| I | industrial gas oil, comparative tests |

TABLE 6

| Property | Method | A | B | C | D | E | F | G | H | I |
|---|---|---|---|---|---|---|---|---|---|---|
| Density 15° C. (kg/m³) | ASTM D4052 | 837.2 | 827.1 | 841.4 | 843.5 | 909.6 | 836.2 | 849.1 | 850.9 | 842.7 |
| Sulphur (mg/kg) | EN ISO 20846 | 22 | 3 | 52 | 12 | 8 | 3 | 47 | 12 | 287 |
| Cloud point (° C.) | ASTM D2500 | −2.9 | −4.4 | −0.9 | −0.8 | −15.0 | −6.9 | −2.5 | −2.1 | −2.0 |
| Cold filter plugging point (° C.) | EN 116 | −4 | −5 | −2 | −2 | −15 | −8 | −4 | −4 | −3 |
| Pour point (° C.) | ASTM D6892 | −3 | −9 | −3 | −6 | −18 | −12 | −6 | −6 | |
| Viscosity at 40° C. (cSt) | ASTM D445 | 3.522 | 3.193 | 3.746 | 3.115 | 3.093 | | | | |
| Cetane number | EN ISO 5165 | 54.6 | | | 50.6 | 27.5 | | | | 49.5 |
| Cetane index | EN ISO 4264 | 57.9 | 61.3 | 57.5 | 51.2 | 30.5 | | | | 50.7 |
| Distillation (° C.) | ASTM D86 | | | | | | | | | |
| Ibp | | 210 | 205 | 189 | 202 | 198 | | | | 180 |
| T5 | | 234 | 233 | 237 | 218 | 242 | | | | 200 |
| T10 | | 244 | 242 | 247 | 227 | 249 | | | | 212 |
| T20 | | 257 | 253 | 261 | 239 | 258 | | | | |
| T30 | | 267 | 261 | 271 | 249 | 264 | | | | 244 |
| T40 | | 276 | 270 | 281 | 260 | 269 | | | | |
| T50 | | 284 | 279 | 291 | 270 | 275 | | | | 274 |
| T60 | | 293 | 288 | 302 | 282 | 281 | | | | |
| T70 | | 303 | 300 | 314 | 295 | 288 | | | | 305 |
| T80 | | 315 | 314 | 329 | 311 | 297 | | | | |
| T90 | | 334 | 333 | 347 | 334 | 312 | | | | 343 |
| T95 | | 354 | 348 | 362 | 354 | 324 | | | | 359 |
| Fbp | | 367 | 356 | 370 | 370 | 336 | | | | |

Tables 5 and 6 also describe the cut E, a desulphurized LCO cut which is used as such and mixed with diesel cuts, as components for preparing hydrocarbon compositions according to the present invention: in particular cut F consists of 89% by volume of gas oil B and 11% by volume of cut E, cut G consists of 89% by volume of cut C and 11% volume of cut E, cut H consists of 89% by volume of cut D and 11% volume of cut E. The cuts shown in these tables are mixed with different volume percentages of the components of a biological origin obtained from example 3.

Table 7 below indicates the characteristics of the cloud point (cp), cold filter plugging point (Cfpp), pour point (pp) and cetane number of the resulting hydrocarbon compositions.

In particular, the first column indicates the diesel cut used for preparing the hydrocarbon composition, the second column indicates its volume concentration, with respect to the total volume, the third column indicates the concentration of the component of a biological origin, according to example 3 and the fourth column indicates the origin of the component of a biological origin:

TABLE 7

| Diesel cut | Vol. Fract. diesel cut | Vol. Fract. hydroisomer. oil | Hydro-isomer. oil origin | cp | CFPP | pp | NC |
|---|---|---|---|---|---|---|---|
|   | 0 | 1 | soya | −1.4 | −5 | −3 | >76 |
|   | 0 | 1 | palm | −15.2 | −16 | −15 | >76 |
| A | 1 | 0 |  | −2.9 | −4 | −3 | 55 |
| A | 0.87 | 0.13 | soya | −3.9 | −6 | −6 | 58 |
| A | 0.81 | 0.19 | soya | −4.3 | −8 | −6 | 60 |
| B | 1 | 0 |  | −4.4 | −5 | −9 |  |
| B | 0.90 | 0.10 | soya | −6.4 | −8 | −9 |  |
| B | 0.5 | 0.5 | soya | −7.3 | −11 | −6 |  |
| B | 0.25 | 0.75 | soya | −5.3 | −8 | −3 |  |
| C | 1 | 0 |  | −0.9 | −2 | −3 |  |
| C | 0.9 | 0.1 | soya | −2.6 | −5 | −6 |  |
| C | 0.5 | 0.5 | soya | −6.4 | −10 | −6 |  |
| C | 0.25 | 0.75 | soya | −4.9 | −8 | −3 |  |
| D | 1 | 0 |  | −0.8 | −2 | −6 | 51 |
| D | 0.87 | 0.13 | soya | −2.1 | −4 | −6 | 55 |
| D | 0.74 | 0.26 | soya | −3.1 | −7 | −6 | 56 |
| D | 0.50 | 0.50 | soya | −6.0 | −10 | −6 | 67 |
| D | 0.25 | 0.75 | soya | −5.3 | −9 | −6 | 76 |
| E | 1 | 0 |  | −15.0 | −15 | −18 |  |
| E | 0.25 | 0.75 | palm | −17.8 | −21 | −18 |  |
| F | 1 | 0 |  | −6.9 | −8 | −12 |  |
| F | 0.9 | 0.1 | soya | −7.4 | −9 | −9 |  |
| G | 1 | 0 |  | −2.5 | −4 | −6 |  |
| G | 0.9 | 0.1 | soya | −3.7 | −6 | −6 |  |
| H | 1 | 0 |  | −2.1 | −4 | −6 |  |
| H | 0.9 | 0.1 | soya | −2.4 | −5 | −6 |  |

It is evident that the hydrocarbon compositions resulting from the combination of the diesel cuts A, B, C, D and E with the component of a biological origin obtained in Example 3, have better characteristics with respect to the cloud point and cfpp compared with the single component of the composition; also in the case of the pour point, there is an analogous phenomenon, mainly with mixtures A and C. The same improvement is also found in the fuel compositions F, G and H, which are the fuels B, C and D, respectively, enriched with LCO. As far as cetane is concerned, as can be seen, this acts as an improver.

EXAMPLE 6

The following example shows the saving that can be obtained in terms of quantity of Cfpp improver additive, when a sample of the diesel cut A is mixed with a component of a biological origin prepared according to example 3. In particular, the table shows that the addition to cut A of the component of a biological origin from soya prepared in example 3, in a quantity increasing from 0.13 to 0.19 by volume, allows a corresponding decrease in the quantity of Cfpp improver necessary for obtaining a Cfpp of −12° C. The Cfpp improver is a commercial product based on ethylene vinyl acetate (EVA) polymers.

TABLE 8

| Diesel Cut | Diesel cut volume fraction | Hydro-isomeriz. oil volume fraction | mg/kg additive | | | Cfpp (° C.) | | mg/kg −12° C. |
|---|---|---|---|---|---|---|---|---|
| A | 1 | 0 | 0 | 100 | 200 | −4 | −9 | −13 | 175 |
| A | 0.87 | 0.13 | 0 | 75 | 150 | −6 | −10 | −14 | 113 |
| A | 0.87 | 0.19 | 0 | 75 | 150 | −8 | −9 | −14 | 120 |

The first column indicates the volume fraction of fuel A, the second column the volume fraction of the hydrocarbon mixture from soya obtained from example 3, the third column the quantity of improver used, the fourth column the corresponding Cfpp trend and the last column the quantity of improver necessary for obtaining a Cfpp of −12° C. in relation to the hydrocarbon composition tested.

EXAMPLE 7

Comparative

A diesel composition according to EP 1674552 is prepared, by mixing gas oil of an industrial origin I, described in table 6, with a bio-diesel from palm oil, i.e. a methyl ester of palm oil (POME) having the characteristics shown in table 9.

TABLE 9

| Property | Method |  |
|---|---|---|
| Density @ 15° C. (kg/m$^3$) | ASTM D4052 | 876.9 |
| Sulphur (mg/kg) | EN ISO 20846 | <3 |
| Cloud point (° C.) | ASTM D2500 | 12.0 |
| Cold filter plugging point ° C. | EN 116 | 9 |
| Pour point (° C.) | ASTM D6892 | 13 |
| Viscosity at 40° C. (cSt) | ASTM D445 | 4.510 |
| Water (mg/kg) | EN ISO 12937 | 290 |
| Cetane number | EN ISO 5165 | 62 |
| CI4 | EN ISO 4264 | 57 |
| Distillation (° C.) | ASTM D86 |  |
| Ibp |  | 313 |
| T5 |  | 322 |
| T10 |  | 324 |
| T30 |  | 326 |
| T50 |  | 327 |
| T70 |  | 330 |
| T90 |  | 336 |
| T95 |  | 346 |
| Fbp |  | 347 |

Table 10 indicates the characteristics of the blends of component I with POME

TABLE 10

| Diesel Cut | Diesel cut volume fraction | POME volume fraction | Cp (° C.) | Cfpp (° C.) |
|---|---|---|---|---|
|  | 0 | 1 | 12.0 | 9 |
| I | 1 | 0 | −2.0 | −3 |
| I | 0.95 | 0.05 | −1.0 | −6 |
| I | 0.90 | 0.1 | −0.7 | −6 |
| I | 0.80 | 0.2 | 3.7 | −1 |

It is evident that the resulting composition does not show any improvement in terms of cloud point (cp) with respect to the single components, and the improvement obtained on the Cfpp is to a lower extent with respect to that which can be obtained with the compositions of the present invention.

The invention claimed is:

1. A method for preparing a hydrocarbon composition, comprising:
   (A) 25 to 90% by volume, based on the total composition of said hydrocarbon composition, of a diesel cut or a blend of diesel cuts having a CFPP of from −15 to 8° C.; and
   (B) 10 to 75 by volume, based on the total composition of said hydrocarbon composition, of a component of a biological origin, which has a CFPP of from −25 to 5° C., said process comprising:
   (1) hydrodeoxygenating (C) a mixture of biological origin, comprising esters of fatty acids and optionally aliquots of free fatty acids, to obtain a hydrodeoxygenated mixture;
   (2) hydroisomerizing at least a portion of said hydrodeoxygenated mixture after optional water and gas flow separation, to obtain (B) said component of a biological origin; and
   (3) mixing (A) said diesel cut or blend of diesel cuts with (B) said component of a biological origin,
   wherein:
   said hydrocarbon composition has a CFPP which is from 1 to 8° C. lower than said CFPP of (A) said diesel cut or blend of diesel cuts, and
   said hydrocarbon composition has a cloud point which is from 1 to 6° C. lower than the cloud point of (A) said diesel cut or blend of diesel cuts and the cloud point of (B) said component of a biological origin.

2. The method according to claim 1, wherein said hydroisomerizing is conducted in the presence of a catalytic system comprising:
   a carrier of an acidic nature, comprising a completely amorphous micro-mesoporous silica-alumina, with a $SiO_2/Al_2O_3$ molar ratio ranging from 30 to 500, a surface area greater than 500 $m^2/g$, a pore volume ranging from 0.3 to 1.3 ml/g, and an average pore diameter smaller than 40 Å, and
   a metal component comprising one or more metals of group VIII, and optionally one or more metals of group VIB.

3. The method according to claim 2, wherein said silica-alumina has a $SiO_2/Al_2O_3$ molar ratio ranging from 50 to 300.

4. The method according to claim 2, wherein said silica-alumina has a porosity ranging from 0.3 to 0.6 ml/g.

5. The method according to claim 2, wherein said carrier of an acidic nature is in an extruded product comprising a binder.

6. The method according to claim 5, wherein said extruded product is prepared by a process comprising:
   preparing an aqueous solution of a tetra-alkylammonium hydroxide TAA-OH, a soluble aluminum compound hydrolysable into $Al_2O_3$, and a silicon compound hydrolysable into $SiO_2$, in the following molar ratios: $SiO_2/Al_2O_3$ from 30/1 to 500/1, TAA-OH/$SiO_2$ from 0.05/1 to 0.2/1, and $H_2O/SiO_2$ from 5/1 to 40/1;
   heating the aqueous solution to cause hydrolysis and gelification and obtain a mixture A with a viscosity of 0.01 to 100 Pa sec;
   adding to said mixture A, first a binder of bohemites or pseudo-bohemites, in a weight ratio with respect to said mixture A of 0.05 to 0.5, and subsequently a mineral or organic acid in a quantity of 0.5 to 8.0 g per 100 g of the binder, to obtain a mixture B;
   heating said mixture B, with stirring, to a temperature of 40 to 90° C., until a homogeneous paste is obtained, which is subjected to extrusion and granulation to obtain the extruded product; and
   drying and calcining the extruded product in an oxidizing atmosphere.

7. The method according to claim 2, wherein said metal component in said catalytic system comprises one or more metals of Group VIII selected from the group consisting of Pt, Pd, Ni, and Co.

8. The method according to claim 7, wherein said catalytic system only contains metals of Group VIII.

9. The method according to claim 8, wherein said catalytic system only contains metals of Group VIII selected from the group consisting of Pt, Pd, Ni, and any mixture thereof.

10. The method according to claim 7, wherein said catalytic system comprises one or more metals of Group VIII selected from the group consisting of Ni and Co, and one or more metals of Group VIB.

11. The method according to claim 2, wherein said metal component comprises at least one metal of group VIII and at least one of Mo and W.

12. The method according to claim 2, wherein said one or more metals of Group VIII is present in an amount of 0.1 to 5% by weight based on the total weight of the catalytic system.

13. The method according to claim 2, wherein said one or more metals of Group VIB is present in an amount of 1 to 50% by weight based on the total weight of the catalytic system.

14. The method according to claim 13, wherein said one or more metals of Group VIB is present in an amount of 5 to 35% by weight based on the total weight of the catalytic system.

15. The method according to claim 2, wherein said catalytic system comprises:
   one or more metals of Group VIII, and a carrier of silica gel and alumina, which is amorphous to X rays, has a $SiO_2/Al_2O_3$ molar ratio ranging from 30 to 500, a surface area of 500 to 1000 $m^2/g$, a pore volume of 0.3 to 0.6 ml/g and a pore diameter within the range of 10 to 30 Å.

16. The method according to claim 2, wherein said catalytic system comprises:
   one or more metals of Group VIII, and
   a calcined carrier of silica gel and alumina, which is amorphous to X rays, has a $SiO_2/Al_2O_3$ molar ratio of 30 to 500, a surface area of 500 to 1000 $m^2/g$, a pore volume of up to 0.8 ml/g and an average pore diameter of 10 to 40 Å.

17. The method according to claim 2, wherein said catalytic system comprises:

one or more metals selected from the group consisting of Pt, Pd, Ir, Ru, Rh, and Re, and a silica-alumina carrier, which is amorphous to X rays, has a $SiO_2/Al_2O_3$ molar ratio of 30 to 500, a surface area greater than 500 m$^2$/g, a pore volume of 0.3 to 1.3 ml/g and an average pore diameter smaller than 40 Å.

18. The method according to claim 2, wherein said catalytic system comprises:

a blend of metals of Groups VIB and VIII, and a carrier of silica gel and alumina, which is amorphous to X rays, has a $SiO_2/Al_2O_3$ molar ratio of 30 to 500, a surface area of 500 to 1000 m$^2$/g, a pore volume of 0.3 to 0.6 ml/g and a pore diameter of 10 to 40 Å.

19. The method according to claim 2, wherein said hydroisomerizing is conducted in a fixed bed reactor.

20. The method according to claim 19, wherein said reactor comprises adiabatic layers.

21. The method according to claim 2, wherein said hydroisomerizing is conducted at a temperature of 250 to 450° C. and a pressure of 25 to 70 bar.

22. The method according to claim 21, wherein said hydroisomerizing is conducted at a temperature of 280 to 380° C.

23. The method according to claim 21, wherein said hydroisomerizing is conduted at a pressure of 30 to 50 bar.

24. The method according to claim 21, wherein said hydroisomerizing is conducted with a LHSV of 0.5 to 2 hr$^{-1}$ and a H$_2$/HC ratio of between 200 and 1,000 hr$^{-1}$.

25. The method according to claim 1, wherein (B) said component of a biological origin is present in an amount of 10 to 40% by volume, based on the total composition of the hydrocarbon composition.

26. The method according to claim 1, wherein said diesel cut is a medium distillate.

27. The method according to claim 1, wherein said diesel cut is selected from the group consisting of a gas oil from primary distillation, a gas oil from vacuum distillation, a gas oil from thermal or catalytic cracking, a fuel from a Fischer-Tropsch process, a fuel of a synthetic origin, and a mixture thereof.

28. The method according to claim 27, wherein the diesel cut is a desulphurized gas oil from fluid bed catalytic cracking LCO.

29. The method according to claim 1, wherein (A) said diesel cut or blend of diesel cuts is a hydrogenated diesel cut or a blend of hydrogenated diesel cuts.

30. The method according to claim 1, wherein (A) said diesel cut or blend of diesel cuts comprises one or more diesel cuts in a mixture with a desulphurized gas oil cut from fluid bed catalytic cracking LCO.

31. The method according to claim 1, further comprising one or more additive.

32. The method according to claim 31, wherein said additive is one or more members selected from the group consisting of a cold behavior improver, an anti-foam performance improver, a cetane number improver, an antirust agent, a detergent, a lubricity improver, an antioxidant agent, an anti-wear agent, and an antistatic agent.

33. The method according to claim 1, wherein (C) said mixture of biological origin is a mixture of vegetable origin or animal origin.

34. The method according to claim 1, wherein said esters of fatty acids are triglycerides of fatty acids, and comprise a mono- or poly-unsaturated hydrocarbon chain of from 12 to 24 carbon atoms.

35. The method according to claim 34, wherein (C) said mixture of biological origin is a vegetable oil, a vegetable fat, an animal fat, a fish oil, or any mixture thereof.

36. The method according to claim 35, wherein said vegetable oil or fat is sunflower oil, rape oil, canola oil, palm oil, soybean, hemp, olive, linseed oil, charlock, peanuts, castor oil, coconut oil, fatty oil contained in pine wood, and fat from food industry, or any mixture thereof, and said animal fat and the fish oil are lard, tallow, a milk fat, or a fat of food industry, or any mixture thereof.

37. The method according to claim 1, wherein (C) said mixture of biological origin is mixed with one or more hydrocarbons before said hydrodeoxygenating.

38. The method according to claim 1, wherein said hydrodeoxygenating is conducted in the presence of hydrogen, and a hydrogenation catalyst comprising a carrier and one or more metals of groups VIII and VIB.

39. The method according to claim 38, wherein said carrier is alumina, silica, zirconia, titania, or an mixtures thereof.

40. The method according to claim 38, wherein said one or more metals are Pd, Pt, Ni, Ni-Mo, Ni-W, Co-Mo, or Co-W.

41. The method according to claim 40, wherein said one or more metals are sulfided.

42. The method according to claim 38, wherein said hydrogenation catalyst is Ni-Mo-P on zeolite, Pd/Zeolite, or Pt/MSA.

43. The method according to claim 38, wherein in said hydrodeoxygenating, streams of hydrogen and feedstock of a biological origin are sent in equicurrent or countercurrent.

44. The method according to claim 38, wherein said hydrodeoxygenation catalyst is formed as microspheres and dispersed in a slurry reactor, and a mixing is effected by mechanic stirring or by forced recirculation.

45. The method according to claim 1, wherein said hydrodeoxygenating is carried out in a reaction zone comprising one or more catalytic beds, in one or more reactors.

46. The method according to claim 45, wherein said hydrodeoxygenating is carried out in a fixed-bed hydrotreating reactor.

47. The method according to claim 45, wherein said reactor comprises at least two adiabatic layers.

48. The method according to claim 45, wherein a stream of hydrogen, liquid feedstock, or both the hydrogen and the liquid feedstock, at a defined temperature, is sent between one catalytic bed and another to obtain a constant or increasing temperature profile.

49. The method according to claim 45, wherein said one or more reactors are a tube-bundle type reactor with multiple tubes, the catalyst is charged inside the tubes, and a diathermic liquid is sent into a mantle side.

50. The method according to claim 49, wherein said one or more reactors are run with a recirculation of part of effluents.

51. The method according to claim 50, wherein a recycling ratio of a recirculated fraction with respect to a fresh feedstock is of from 0.5:1 to 5:1 by weight.

52. The method according to claim 1, wherein said hydrodeoxygenating is conducted at a pressure of 25 to 70 bar and at a temperature of 240 to 450° C.

53. The method according to claim 52, wherein said hydrodeoxygenating is conducted at a temperature of 270 to 430° C.

54. The method according to claim 52, wherein said hydrodeoxygenating is conducted at a pressure of 30 to 50 bar.

55. The method according to claim 52, wherein said hydrodeoxygenating is conducted at a LHSV of 0.5 to 2 $hr^{-1}$.

56. The method according to claim 52, wherein said hydrodeoxygenating is conducted with a $H_2$/(C) said mixture of biological origin ratio of 400 to 2,000 Nl/l.

57. The method according to claim 1, wherein (C) said mixture of biological origin is subjected to a pretreatment before said hydrodeoxygenating, and the pretreatment is effected by an adsorption, a treatment with one or more ion exchange resins, or acidic washings.

58. The method according to claim 1, wherein said hydrodeoxygenated mixture is subjected to purification before said hydroisomerizing, and said purification comprises a separation and a washing.

59. The method according to claim 58, wherein the hydrodeoxygenated mixture is sent to a high pressure gas-liquid separator, in order to recover a gaseous phase and a liquid phase, during the separation.

60. The method according to claim 59, wherein said gaseous phase, comprising hydrogen, water, CO, $CO_2$, light paraffins, and optionally small amounts of $NH_3$, $PH_3$ and $H_2S$, is cooled, water and condensable hydrocarbons are separated by condensation, and a remaining gaseous phase is purified to obtain hydrogen which optionally is recycled to said hydrodeoxygenating.

61. The method according to claim 59, wherein said liquid phase separated in said high pressure separator, formed by a hydrocarbon fraction, essentially consisting of linear paraffins with a number of carbon atoms varying from 14 to 21, is washed with hydrogen, nitrogen or a gaseous hydrocarbon, in a stripper, before said hydroisomerizing.

62. The method according to claim 1, wherein said hydroisomerizing is conducted in the presence of
hydrogen, and
a catalytic system comprising one or more metals of Group VIII and one or more metals of Group VI.

63. The method according to claim 1, wherein said hydrodeoxygenated mixture is fed to a reactor in equicurrent or countercurrent with respect to hydrogen.

64. The method according to claim 63, wherein
said hydrodeoxygenated mixture is fed to the reactor in countercurrent,
said reactor comprises at least two layers, and
a first layer of the reactor, immersed by the hydrodeoxygenated mixture, consists of a filler consisting of inert material or pellets or spherules of inert material.

65. The method according to claim 1, wherein said hydroisomerizing is conducted in the presence of hydrogen at a temperature of 250 to 450° C. and a pressure of 25 to 70 bar.

66. The method according to claim 1, which further comprises adding at least one additive for improving the cold behaviour in a concentration not higher than 1% by weight, based on the weight of said composition.

67. The method according to claim 1, wherein said hydrocarbon composition has a CFPP which is lower than the CFPP of (B) said component of a biological origin.

* * * * *